INVENTOR:
RALPH G. FEAR,
ATTORNEY.

Jan. 16, 1934.    R. G. FEAR    1,943,664
PUMP AND MOTOR MECHANISM
Filed June 29, 1931    4 Sheets-Sheet 3
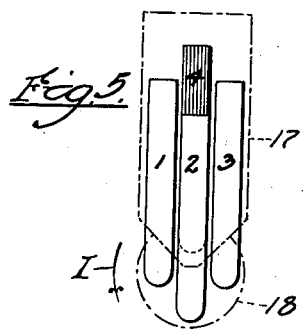
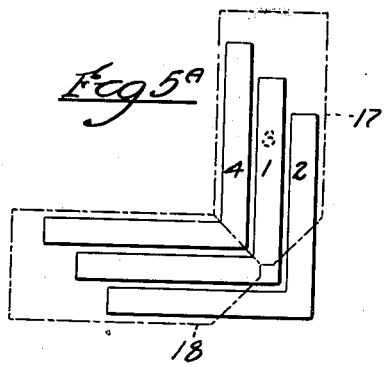
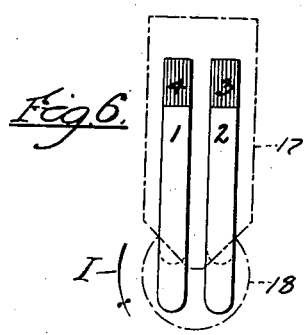
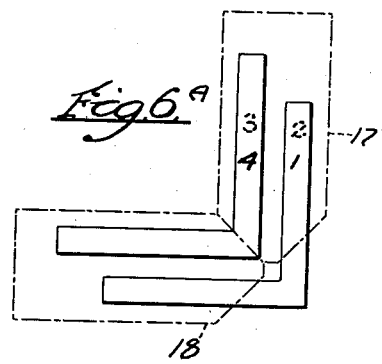
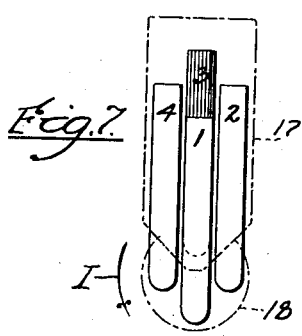
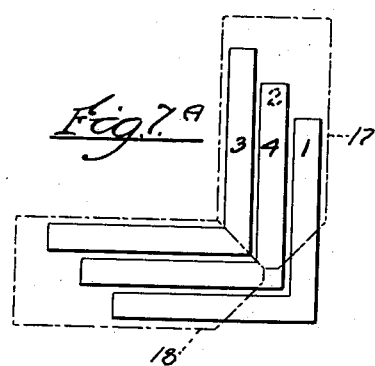
INVENTOR:
RALPH G. FEAR,
By
ATTORNEY.

Jan. 16, 1934.    R. G. FEAR    1,943,664
PUMP AND MOTOR MECHANISM
Filed June 29, 1931    4 Sheets-Sheet 4

INVENTOR:
RALPH G. FEAR,
BY
ATTORNEY.

Patented Jan. 16, 1934

1,943,664

UNITED STATES PATENT OFFICE 1,943,664

PUMP AND MOTOR MECHANISM

Ralph G. Fear, Los Angeles, Calif.

Application June 29, 1931. Serial No. 547,665

2 Claims. (Cl. 230—57)

This invention relates broadly to that general class of machines embracing engines or motors, pumps, air compressors and the like, and is more particularly related to machines of this general character wherein the motive power, in the event the machine is operating as a motor, is derived from the movement of a piston or pistons which are actuated by compressed gas, steam, or a liquid under pressure.

It is the primary object of this invention to produce a machine of the class described which is of simple form and construction, of high mechanical efficiency, and which may be economically manufactured.

It is a noteworthy feature of this invention that the machine contemplated thereby has a minimum number of moving parts, the machine is characterized by the absence of valves and their associated mechanism, connecting rods, crank shafts and other moving parts ordinarily found in machines of this nature. As an example of the simplicity of the machine contemplated by this invention it will appear from the description which is to follow that I have developed a motor which may have eight cylinders and only six moving parts.

It is a further object of this invention to produce a machine of the class described wherein the same unit without altering or changing any of the parts may be used as a steam or compressed gas engine wherein power may be taken from the drive shaft, or as a pump or air compressor under which conditions power is applied to the drive shaft. This same unit may also be used as a combination engine and pump or compressor and under such conditions power may also be taken from the drive shaft.

The essential elements in the machine contemplated by this invention consists of a pair of cylindrical rotors which are disposed at right angles with each other, each having one end adjacent to a corresponding end of the other. These rotors are supported in a suitable housing, such housing embodying cylindrical chambers wherein the rotors revolve and both rotors are provided with a plurality of corresponding angularly spaced piston chambers, the corresponding chambers in both rotors receiving sections of angular piston members. Each rotor is provided with a series of ports situated at the inner ends of the piston chambers and the rotor housings each contain an inlet and an outlet port adapted to communicate successively with the ports in the rotors.

It is an important feature of the machine contemplated by this invention that the number of units may be multiplied to any desired extent with a consequent multiplication in power. The machine is positive in its action. As pointed out above there are a minimum number of wearing parts and the drive shaft, in the event the machine is to be used as an engine or a motor driven air compressor, is attached directly to or formed integrally with one of the rotors.

The details in the construction of certain preferred embodiments of my invention, together with other objects attending its production, will be best understood from the following description of the accompanying drawings wherein—

Fig. 4 is a sectional elevation taken in a plane represented by the line 4—4 in Fig. 2;

Figure 1:
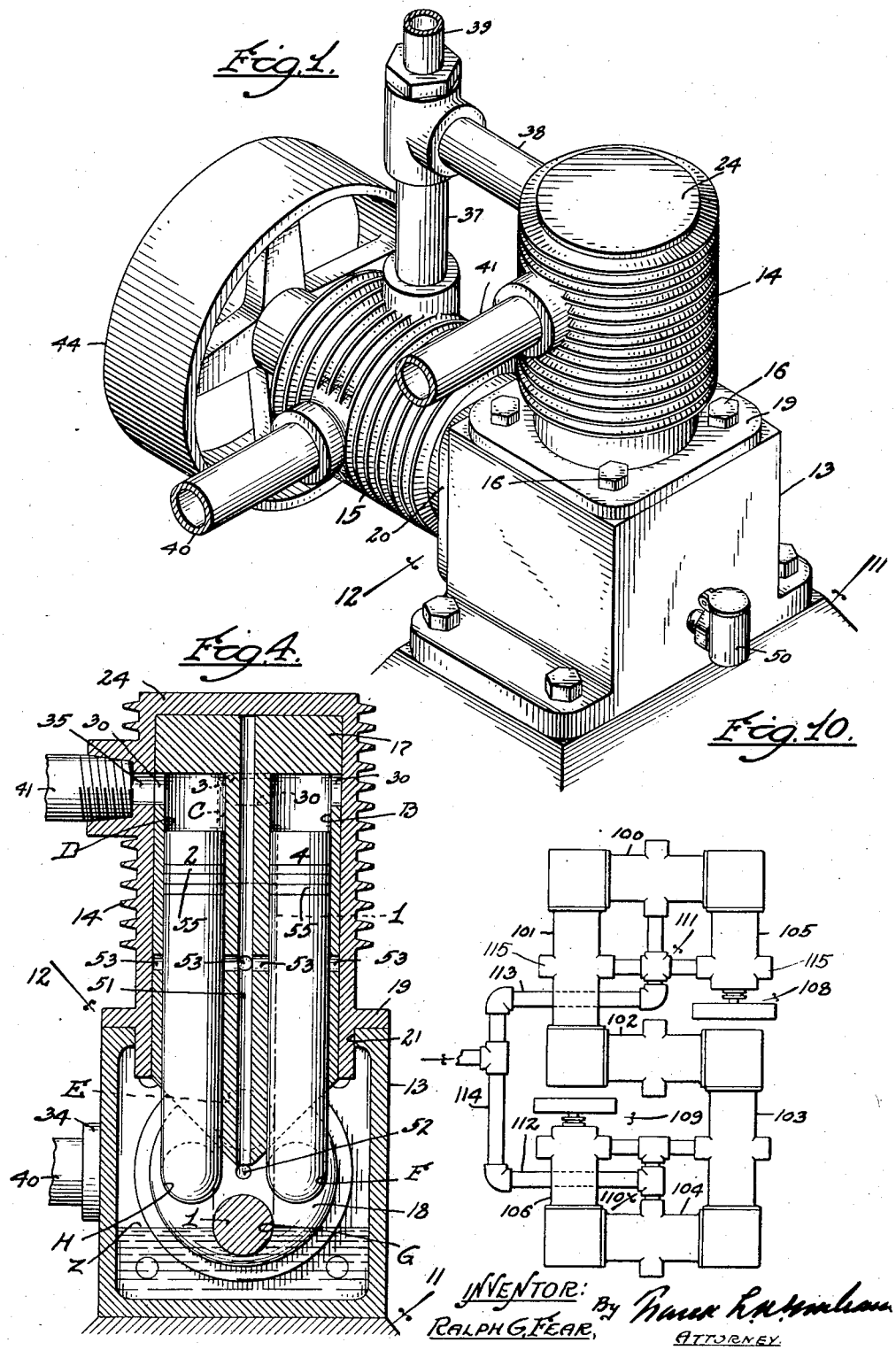
Fig. 1 is a perspective view showing one form of my invention.
Figure 8:
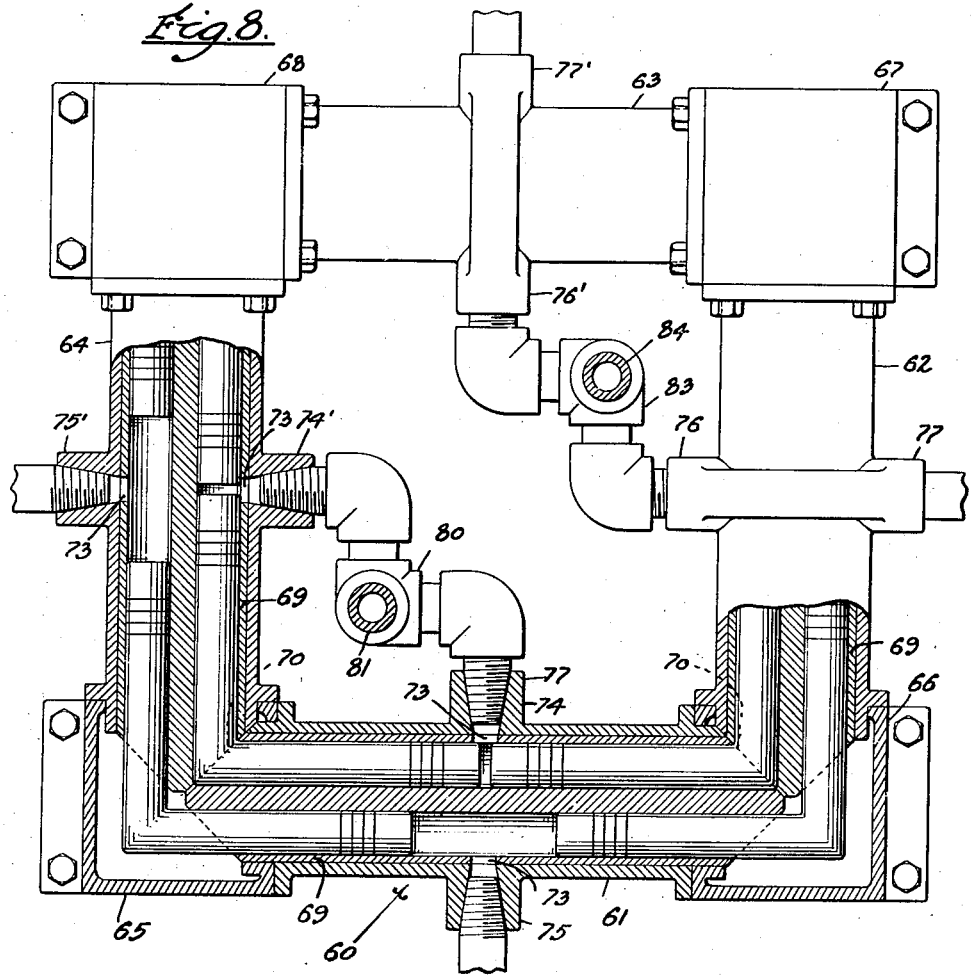
Figure 9:
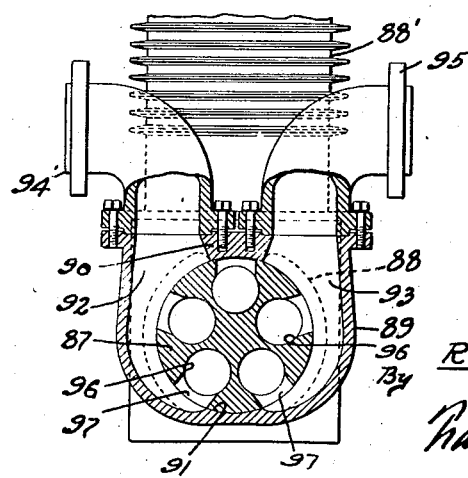

Figs. 5, 5A, 6, 6A, and 7, 7A, are sets of diagrammatic views illustrating the operation of a machine of the type shown in Fig. 1;

Fig. 8 is a plan view with parts broken away showing a modified form of my invention;

Fig. 9 is an elevational view with parts broken away showing another modified form of my invention;

Fig. 10 is a plan view showing still another modified form of my invention.

More particularly describing the invention as herein illustrated, reference numeral 11 indicates a base member which supports a housing generally indicated by reference numeral 12. The housing 12 comprises an oil or crank case 13 and rotor housings 14 and 15 which are secured to the crank case by means of bolts or cap screws 16. It will be observed from the construction so far described that the rotor housings 14 and 15 are secured to faces of the crank case which are at right angles to each other so that the housings 14 and 15 are disposed at right angles to each other.

Figure 2:
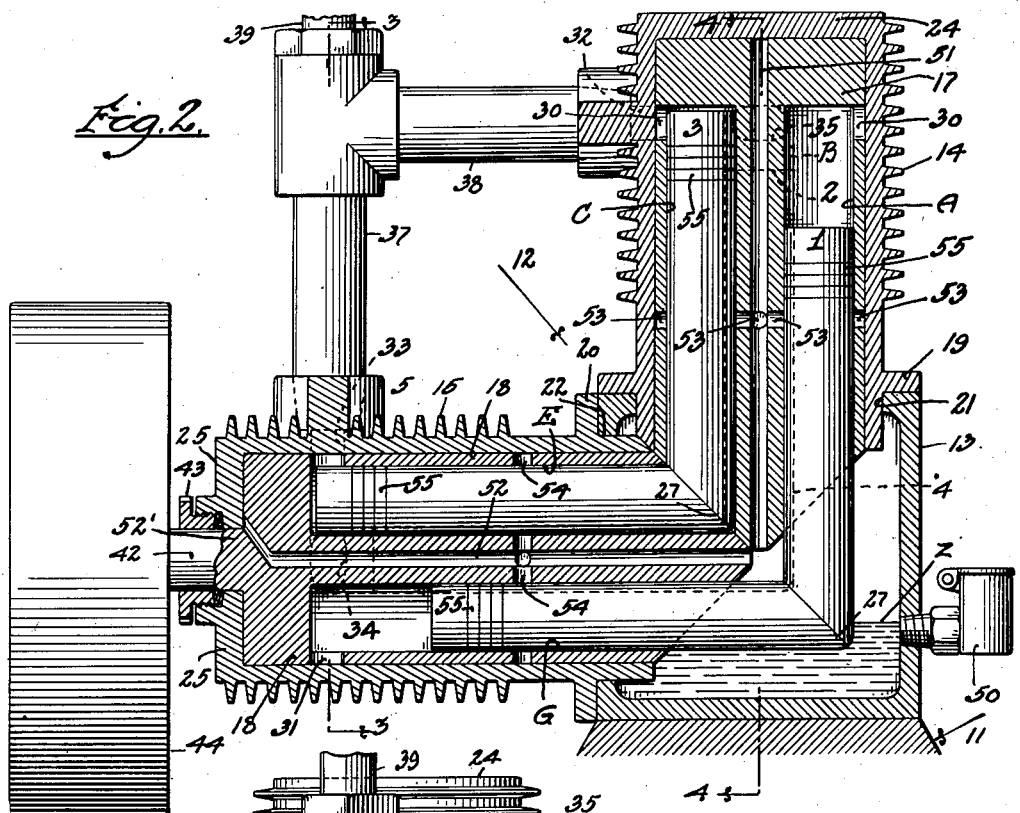
Fig. 2 is a sectional elevation illustrating the details in the construction of that form of my invention shown in Fig. 1.
Figure 3:
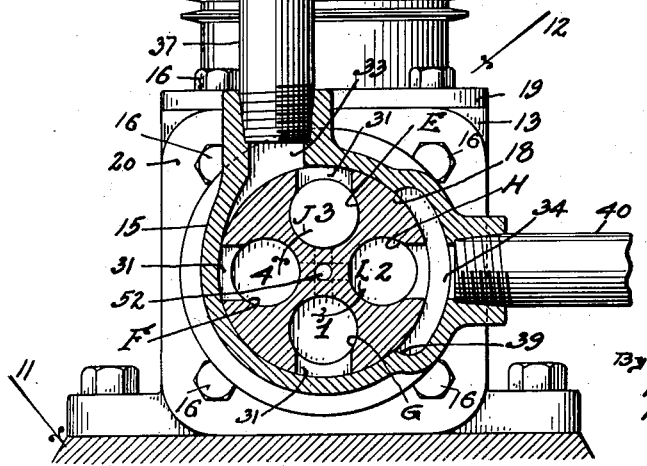
Fig. 3 is a sectional elevation taken in a plane represented by the line 3—3 in Fig. 2.

The details in the construction of this unit are perhaps best illustrated in the sectional views shown in Figs. 2 to 4 inclusive where it will be noted that the rotor housings 14 and 15 are provided with cylindrical chambers which receive rotors 17 and 18. In this form of my invention the cylindrical inner surfaces of the housings 14 and 15 form bearings for the rotors 17 and 18. It is important that the outer end portions of the cylindrical rotor surfaces or the ends most remote from the adjacent ends of the respective rotors be in sliding engagement with the interior of these housings.

It will be noted that the bolts 16 which secure the housings 14 and 15 to the crank case 13, extend through flanges 19 and 20 formed on the exterior of these housings and that the housings are formed so as to project a substantial distance through openings 21 and 22 in the crank case, thus making a rigid and well braced construction. The upper end portions of the rotors 17 and 18 are shown as being substantially flat and in rotatable engagement with the outer capped ends 24 and 25 of the housings so that the ends of the housings form thrust bearings for the outer ends of the retorts. It will be understood that any suitable thrust bearing of the roller or ball type may be used at these points to reduce frictional resistance to the operation of the machine. The inner ends of the rotors are made conical in shape and the rotors and housings are so proportioned that the inner conical ends of the rotors bear against each other so that each acts as a thrust bearing for the other to prevent inward axial movement.

Each of the rotors is provided with a plurality of corresponding longitudinal piston chambers. In this form of my invention there are four such chambers in each rotor. The chambers in rotor 17 are indicated by reference characters A, B, C and D and the chambers in rotor 18 are indicated by reference letters E, F, G and H. The corresponding sets of these chambers, for example chambers C—E, A—G, B—F, and D—H, are all disposed at right angles with each other and are adapted to receive end sections of right angled or elbow-shaped piston members indicated by reference numerals 1, 2, 3 and 4. These piston members 1, 2, 3 and 4 are shown as being made in the form of cylindrical sections which may be solid or hollow with capped inner ends and which are shown as being rigidly secured together at their outer ends, as indicated at 27, to form rigid elbow shaped units. The individual ends or sections of each of these units are adapted for both longitudinal and rotative movement relative to the particular piston chamber in which they are received.

It will be noted from the construction so far described that each individual piston chamber and its corresponding piston section comprises a "cylinder" wherein a piston is adapted for reciprocation, such "cylinder" consisting of the upper or inner portion of the piston chamber which is situated in the outer end of the rotor. In order that these chambers may be utilized as expansion or compression chambers for operating the machine as an engine or a compressor respectively, I provide each rotor with a series of ports indicated by reference numerals 30 and 31. These ports are situated at the extreme inner ends of the piston members when such members have reached the ends of the compressive strokes in the respective piston chambers, such as the position indicated by the piston member 3 in Fig. 1.

In the form of my invention shown in Figs. 2 to 7A inclusive, it will be seen that there are in each of the rotors 17 and 18 four piston chambers, each of which contains a piston member, all such chambers being disposed at right angles to each other, the piston members being likewise disposed and rigidly connected at their innermost ends. If rotative movement is imparted to either one of the rotors, such movement is immediately carried to the adjacent rotor by means of the various elbow piston members with a result that the pistons are moved longitudinally in their various piston chambers. This operation is perhaps best illustrated in Figs. 5 to 7A inclusive. Fig. 5, for example, shows the piston 4 at the end of its up-stroke, the piston 2 at the end of its down stroke, and the pistons 1 and 3 having passed 90° from their up-to-down and down-to-up strokes, respectively. Assuming the rotor 18 to be rotating in the direction of the arrow I, it will be observed that during the movement of this rotor through 45° the pistons assume the positions shown in Fig. 6. Figs. 5A and 6A illustrate the manner in which the pistons move when considered from the side elevation. The continued movement of the rotor through another 45° carries the pistons to the positions shown in Figs. 7 and 7A where it will be observed that the piston 1 has reached the bottom of its down stroke and the piston 3 has reached the top of its up stroke. From these figures it will be observed that the continued rotation of the rotor causes the various piston chambers to revolve about their corresponding pistons and is at the same time effective to cause the pistons to reciprocate in their various piston chambers. Similarly, if a gas or steam under pressure is admitted above the pistons at the end of their up-stroke, the expansion of this gas or steam will force the pistons downwardly or outwardly in their chambers and consequently effect the rotation of both of the rotors.

In order that this mechanical movement just described may be applied to a useful purpose, I provide both of the rotor housings 14 and 15 with angularly spaced inlet and outlet ports indicated by reference numerals 32 and 33, 34 and 35, respectively. These ports are positioned so that they are adapted to communicate successively with the various ports on the two rotors 17 and 18. Whether the various ports in the housing are inlet or outlet ports depends of course on whether the machine is being used for a motor or a compressor.

Assuming that the machine is being used as a motor, steam or gas under pressure enters through the ports 32 and 33 which are shown as being connected through pipe connections 37 and 38 with a pressure line 39. The consequent operation is perhaps best illustrated in the view of rotor 18 as shown in Fig. 3. This pressure fluid enters piston chamber E through its port 31 and forces the piston member 3 downwardly or outwardly therein. With the arrangement of ports shown in the drawings, this operation is attended by an introduction of pressure fluid into the piston chamber C through its corresponding port 30. The downward or outward movement of the piston member 3 relative to the ends of the piston chambers is attended by a rotative movement of the two rotors, such movement being illustrated by the arrow J in Fig. 3. At the same time the gas or steam under pressure is expanding in piston chamber F, such expansion co-acting with the piston 3 by forcing piston 4 outwardly until it reaches the position occupied by piston 1. Exhaustion takes place when the port from piston chamber or cylinder G has advanced to a position opposite the exhaust chamber 39, after which the continued rotation of the rotor forces the gas or steam therein into the chamber 39 from which it exhausts through port 34 into exhaust pipe 40 through which it is expelled to the atmosphere. At the same time an identical operation takes place in rotor housing 14 from which the exhaust gases leave through pipe 41. It will be observed that any desirable timing of the "valve action" may be obtained by merely changing the relative positions of the ports in the rotor casings.

During this operation it will be observed that the pressure fluid is utilized to impart rotation to both the rotors 17 and 18. In order that this rotation may be obtained and used as power, I provide at least one of the rotors shown as rotor 18, with a shaft 42 which projects out through a suitable packing and bearing nut 43 in the end plate 25 where its projecting end is provided with a pulley wheel 44. When the machine is to be operated as a compressor, power is applied to the pulley wheel 44 in any suitable manner such as by means of a belt and an electric motor, not shown, and the rotor 18 is revolved in the general direction of the arrow L, such rotation of the rotor 18 being attended by a corresponding rotation of rotor 17. During this rotation it will be observed that the piston 2, for example, as it moves past the chamber 39, is traveling outwardly in its piston chambers H and B, such outward movement being effective to draw air into the chambers H and B through the ports 34 and 35. Cylinders G and A, which have in the meantime been filled with air, having reached the position shown in Fig. 2, are being moved into a cycle through which the piston member 1 will move inwardly toward the ends of the respective chambers A and G. Chamber F occupies a position in which the air has been compressed through rotation of substantially 90° of the rotor and immediately after leaving this position the compressed air is exhausted through ports 33 and 32. This exhaustion of the compressed air takes place until just after the chamber occupies the position occupied by chamber E, after which the piston member in the two chambers corresponding to E and C will enter the cycle for the "in-take stroke".

By connecting the port 32 with a high pressure steam line and the port 34 with a compressed air receiver, it will be seen that the piston chambers in rotor 17 may be employed as a source of power for compressing air in the chambers in rotor 18 and since the operation of the ports as described above is necessarily attended by a rotation of both rotors, power may be derived during such operation from the pulley 44.

For the purpose of lubricating the moving parts during the operation of the machine, I provide the oil case or crank case 13 with an oil cup indicated by reference numeral 50. The crank case 13 is generally filled with oil to the level indicated by the line Z, so that each of the piston members as it passes through its "out-stroke" is partially immersed in the oil. Inasmuch as the parts are as a rule moving at a very high rate of speed, the piston members are well lubricated, and for the purpose of lubricating the rotor members 17 and 18, I provide such members with axial passages 51 and 52, respectively. The passage 51 extends to the extreme outer end of the housing 14 for supplying lubricating oil to the bearing surface between the end plate 24 and the end of the rotor and at an intermediate point I provide radial passages 53 which lead to the cylindrical wall of the rotor housing. The axial passage 52 terminates in an offset passage 52′ which leads to the outer face of the rotor 18. Radial passages 54 in rotor 18 project from axial passage 52 and lubricant is delivered through these passages to the inner surface of the rotor housing 15. Reference numeral 55 indicates rings which are preferably placed near the inner ends of the piston sections which extend into the various piston chambers.

In Fig. 8 I show a modified form of my invention wherein the principle just described is embodied in a steam or pressure operated pump or air compressor. In this form of my invention the housing 60 is shown as comprising four cylindrical rotor housings 61, 62, 63 and 64, these housings being arranged to form a square and the adjoining housings being interconnected by means of cases or box members 65, 66, 67 and 68. The rotor members in this form of my invention are indicated generally by reference numeral 69 and are illustrated as being of sufficient length to accommodate two piston members. These rotors are provided with conical bearing surfaces on both ends of each rotor engaging corresponding bearing surfaces on the adjacent ends of the two adjacent rotors, as indicated at 70.

In this form of my invention the piston chambers in the various rotors extend longitudinally clear through the rotors and each chamber has a piston member extending into each end of the chamber. The rotors are provided with ports 73 situated at intermediate points in the various piston chambers and the length of the piston members is such that there is always a space between the ends of adjacent piston members and the corresponding port. The rotor housings are provided with ports 74, 74′, 75, 75′, 76, 76′ and 77, 77′. These ports are adapted to communicate successively with the ports in the various rotors. In this form of my invention the ports 74 and 74′ are interconnected by pipe connections 80 with a steam delivery pipe 81. In this manner the pistons in the rotors in housings 61 and 64 are operated by steam pressure, such operation being obviously effective to rotate the rotors in housings 62 and 63. The pistons in these rotors therefore act as compressors, the ports 77 and 77′ comprising intake ports and the ports 76 and 76′ being connected through pipe connections 83 to a main connection 84 which leads to a compressed air storage tank. This form of my invention is obviously not designed for use in producing rotative power, the only function of that part of the machine which acts as an engine being to operate the other part of the machine which acts as a compressor.

In the forms of my invention described so far the construction of the housing ports is designed primarily for use in connection with a compressible fluid such as gas. The same principle of construction and operation of the machine may, however, be incorporated in a liquid pump or a liquid motor and to illustrate the modifications made in the former construction to adapt the machine to this use, I have shown in Fig. 9 a fragmentary view with parts broken away so as to illustrate the arrangement of the liquid inlet and outlet ports with relation to the various ports in the rotors. In this view I have shown only a section through one of the rotors in the region in which the rotor ports communicate with the ports in the housing. It will be observed that the construction of the housing at the ported portion thereof differs from that described in connection with Figs. 1 to 8 inclusive in that the rotor in this region may be described as being enclosed by two chambers designed so that each rotor port opens as soon as it passes its associated housing port. In other words, each of the chambers which communicate with the inlet and outlet ports covers slightly less than 180° of the circumference of the rotor.

The rotor 87 in this form of my invention is shown as being supported by a rotor housing 88, the ported end of the rotor being enclosed by a chambered portion 89 which is divided by a bearing plate 90 and a bearing section 91 to form an inlet chamber 92 and an outlet chamber 93. The inlet chamber 92 is connected to an inlet connection 94 and the outlet chamber 93 is connected to an outlet connection 95. It will be understood, of course, that this same construction may be duplicated in the rotor housing 88′, or if desired the rotor housing 88′ may be provided with ports of the type described in connection with Figs. 1 to 8, inclusive, and the piston members in the rotor contained in this housing may be operated by steam or gas pressure for the purpose of operating the rotor 87 as a pump. In this particular form of my invention I have chosen to show the rotor 87 as being provided with five piston chambers instead of four, such chambers being indicated by reference numeral 96 and each of the piston chambers is of course provided with a port at its inner end indicated by reference numeral 97. The piston chambers receive pistons identical with those described above. Assuming the rotor to be rotated in the direction of the arrow N, the pistons passing through chamber 92 will be moving outwardly away from the ports in their respective piston chambers, filling the outer end portions of these chambers with liquid coming through the inlet connection 94. After passing the bearing surface 91 the pistons in the piston chambers as they pass through chamber 93, are forced inwardly toward their corresponding ports so that the liquid is forced out through the outlet connection 95. As pointed out above, the rotation of the rotor may be effected by the action of a pressure fluid in the piston associated with housing 88′, or both of the housings may be equipped with port connections similar to the one shown in section and the rotors revolved through the medium of a drive shaft similar to that shown and described in connection with Fig. 1.

The machine shown in Fig. 9 may, as pointed out above, be used for a liquid pump or for a liquid operated motor or engine.

Fig. 10 illustrates the manner in which the mechanical principle embodied in my invention may be multiplied with a consequent multiplication in power. In this form of my invention I have shown five double rotor units, 100, 101, 102, 103 and 104 arranged as a figure S. This set or series of double rotor units is shown as terminating in single rotor units 105 and 106, which are similar to the units associated with rotor housing 15 in Fig. 1. I have also shown each of these latter rotor units as being provided with a drive shaft and pulley wheel indicated generally by reference numerals 108 and 109 respectively. It will be understood that this unit may be used either as a motor or a compressor. In the drawings I have shown it as being arranged for use as a motor and have shown the inlet ports of units 103, 104, and 106 as being connected to a pipe connection indicated generally by reference numeral 110 and the inlet openings of units 101, 100 and 105 as being connected to an inlet pipe connection indicated generally by reference numeral 111. These two connections 110 and 111 are connected through pipes 112 and 113 to a main gas or steam inlet pipe 114. It will be observed that I have shown no connection to the ports in the unit 102. This is due to the fact that the pistons in the rotor in this unit move with each other all the time rather than alternately toward and away from each other, as is the case in the other units which are arranged in the same manner as those shown in section in Fig. 8. The unit 102 acts as a means for transmitting the motion and the consequent power from unit 101 to unit 103. In actual operation the power is preferably taken off at only one of the pulleys 108 or 109 and it will be understood that the number of units may be multiplied to any desired extent by arranging them in the manner shown in Fig. 10, or by various modifications of this arrangement. The outlet port in the device shown in Fig. 10 is indicated generally by reference numeral 115.

It will be apparent from the foregoing description that the machine contemplated by this invention is of extremely simple construction, it is very compact and is adapted for any number of uses. In disassembling units of the type shown in Fig. 1, it is only necessary to break or remove the pipe connections and the pulley 44, then by removing the cap screws 16 the two rotor housings may be removed after which one or both of the housings may be drawn away from the piston members and the piston members by a slight swinging movement can be readily withdrawn from the crank case 13.

It is to be understood that while I have herein described and illustrated the invention as being embodied in certain preferred forms of machines, the invention is not limited to any of the specific constructions described above but includes within its scope whatever changes fairly come within the spirit of the appended claims.

I claim as my invention:

1. A machine of the class described embodying: a housing member containing four cylindrical chambers arranged at right angles with each other to form a square; a cylindrical rotor in each of said chambers, said rotors having engaging bearing surfaces formed on their respective adjacent end portions, said rotors being provided with a plurality of corresponding angularly spaced piston receiving passages; a plurality of piston members having angularly disposed piston sections extending into the passages in adjacent rotors, said rotors being provided with ports communicating with said chambers between the ends of said piston sections, and said housing being provided with inlet and outlet ports adapted to communicate successively with the ports in said rotors, part of said inlet ports communicating with a source of pressure fluid, the corresponding outlet ports exhausting to the atmosphere, and the remainder of said inlet ports communicating with a source of gas to be compressed, the corresponding outlet ports communicating with a compressed gas storage means.

2. A machine of the class described embodying: a housing member containing four cylindrical chambers arranged at right angles with each other to form a square; a cylindrical rotor in each of said chambers, said rotors having engaging bearing surfaces formed on their respective adjacent end portions, said rotors being provided with a plurality of corresponding angularly spaced piston receiving passages; a plurality of piston members having angularly disposed piston sections extending into the passages in adjacent rotors, said rotors being provided with ports communicating with said chambers between the ends of said piston sections, and said housing being provided with inlet and outlet ports adapted to communicate successively with the ports in said rotors, the corresponding inlet and outlet ports associated with two of the adjacent rotors being interconnected, to form main inlet and outlet connections, one of said main inlet connections being connected to a source of pressure fluid, and the corresponding outlet connection being connected to a suitable exhaust, the other main inlet connection being connected to a source of gas to be compressed, and the corresponding outlet connection being connected to a compressed gas storage means.

RALPH G. FEAR.